(12) United States Patent
Hirano (10) Patent No.: US 7,548,385 B2
(45) Date of Patent: Jun. 16, 2009

(54) WIDE-ANGLE LENS SYSTEM

(75) Inventor: Hiroyuki Hirano, Kanagawa (JP)

(73) Assignee: Hoya Corporation, Tokyo (JP)

( * ) Notice: Subject to any disclaimer, the term of this patent is extended or adjusted under 35 U.S.C. 154(b) by 61 days.

(21) Appl. No.: 11/934,324

(22) Filed: Nov. 2, 2007

(65) Prior Publication Data

US 2008/0106809 A1     May 8, 2008

(30) Foreign Application Priority Data

Nov. 6, 2006     (JP)     ............... 2006-299867

(51) Int. Cl.
   *G02B 9/58*     (2006.01)
   *G02B 9/34*     (2006.01)
(52) U.S. Cl. .................. 359/782; 359/781; 359/771
(58) Field of Classification Search .................. 359/753, 359/771, 781, 782
   See application file for complete search history.

(56) References Cited

U.S. PATENT DOCUMENTS

| | | | |
|---|---|---|---|
| 6,043,941 A | 3/2000 | Yamada et al. | |
| 2004/0150894 A1 | 8/2004 | Saori | |
| 2005/0237627 A1 | 10/2005 | Hirakawa | |
| 2005/0280901 A1 | 12/2005 | Tomioka | |
| 2006/0126192 A1 | 6/2006 | Ryu et al. | |
| 2007/0201140 A1 | 8/2007 | Kato | |

FOREIGN PATENT DOCUMENTS

| | | | |
|---|---|---|---|
| JP | 5 264895 | | 10/1993 |
| JP | 09-033802 | * | 2/1997 |
| JP | 10 39207 | | 2/1998 |
| JP | 2004 354829 | | 12/2004 |
| JP | 2006 3589 | | 1/2006 |

OTHER PUBLICATIONS

English language Abstract of JP 5-26489, Oct. 15, 1993.
English language Abstract of JP 2004-354829, Dec. 16, 2004.

* cited by examiner

*Primary Examiner*—David N Spector
(74) *Attorney, Agent, or Firm*—Greenblum & Bernstein, P.L.C.

(57) ABSTRACT

A wide-angle lens system includes a negative first meniscus lens element, a positive second lens element, a positive third biconvex lens element, and a negative fourth meniscus lens element, in this order from the object;
   wherein said wide-angle lens system satisfies the following condition: $0.25 < \Delta H/(p3+p4) < 0.60$
   wherein $\Delta H$ designates the distance between the second principal point of the positive third biconvex lens element and the first principal point of the negative fourth meniscus lens element, when the focal length of the entire wide-angle lens system is normalized to 1.0;
   p3 designates the refractive power of the positive third biconvex lens element when the focal length of the entire wide-angle lens system is normalized to 1.0;
   f3 designates the focal length of the positive third biconvex lens element when the focal length of the entire wide-angle lens system is normalized to 1.0, i.e., $p3=1/f3$;
   p4 designates the refractive power of the negative fourth meniscus lens element when the focal length of the entire wide-angle lens system is normalized to 1.0; and
   f4 designates the focal length of the negative fourth meniscus lens element wherein the focal length of the entire wide-angle lens system is normalized to 1.0, i.e., $p4=1/f4$.

14 Claims, 7 Drawing Sheets

FNo.=1 : 2.83

— d Line
···· g Line
--- C Line

-0.05  0.05

SPHERICAL
ABERRATION

CHROMATIC
ABERRATION

LATERAL
CHROMATIC
ABERRATION

ASTIGMATISM

DISTORTION

Fig.3

Fig.4A
FNo.=1 : 2.83

— d Line
------ g Line
— — C Line

-0.05  0.05
SPHERICAL
ABERRATION
CHROMATIC
ABERRATION

Fig.4B
W= 36.3

-0.01  0.01
LATERAL
CHROMATIC
ABERRATION

-0.05  0.05
ASTIGMATISM

Fig.4D
W= 36.3

-10.0  10.0 %
DISTORTION

FNo.=1 : 2.83

—— d Line
······· g Line
– – – C Line

-0.05  0.05

SPHERICAL
ABERRATION

CHROMATIC
ABERRATION

LAERAL
CHROMATIC
ABERRATION

ASTIGMATISM

DISTORTION

Fig.7

Fig.8A
FNo.=1 : 2.83

— d Line
······ g Line
--- C Line

-0.05  0.05

SPHERICAL
ABERRATION

CHROMATIC
ABERRATION

LATERAL
CHROMATIC
ABERRATION

ASTIGMATISM

DISTORTION

FNo.=1:2.83 d Line
g Line
C Line

-0.05  0.05

SPHERICAL
ABERRATION

CHROMATIC
ABERRATION

LATERAL
CHROMATIC
ABERRATION

ASTIGMATISM

DISTORTION

FNo.=1:2.83

—— d Line
----- g Line
------ C Line

-0.05   0.05

SPHERICAL
ABERRATION

CHROMATIC
ABERRATION

LATERAL
CHROMATIC
ABERRATION

ASTIGMATISM

DISTORTION

FNo.=1 : 2.83

-0.05   0.05
SPHERICAL
ABERRATION

CHROMATIC
ABERRATION

— d Line
---- g Line
----- C Line

-0.01   0.01
LATERAL
CHROMATIC
ABERRATION

-0.05   0.05
ASTIGMATISM

-10.0   10.0 %
DISTORTION

WIDE-ANGLE LENS SYSTEM

BACKGROUND OF THE INVENTION

1. Field of the Invention

The present invention relates to a wide-angle lens system for use in a surveillance camera or an in-vehicle camera, etc., and in particular, relates to an inexpensive wide-angle lens system having a four-lens-element arrangement for in-vehicle use for detecting white lines on roads and obstacles by projecting near-infrared light in addition to visible light.

2. Description of the Prior Art

In recent years, due to developments in ITS (Intelligent Transport Systems), sensor cameras for driving support are used in addition to conventional back monitor cameras. Furthermore, in addition to normal headlights, a sensor-camera-installed vehicle is provided with a near-infrared projector which can be used in night driving; and an imaging device, such as a CCD or a CMOS, etc., which is arranged to have a practical sensitivity covering the near-infrared region, is used.

Accordingly, a lens system for such a sensor camera is required to have at least the following features:

(i) the lens system has a wider angle-of-view;

(ii) chromatic-correction is adequately made from the visible light region to the near-infrared light region;

(iii) the lens system is usable even in a temperature change from approximately −30° C. to approximately +90° C. since the sensor camera is used inside a vehicle; and (iv) the lens system is inexpensive.

However, in a conventional wide-angle lens system which is originally designed to be used with a general infrared-cut filter, the correcting of chromatic aberration is insufficient. Consequently, such a conventional wide-angle lens system cannot be used in an in-vehicle sensor camera.

Furthermore, a surveillance camera lens system, e.g., as disclosed in Japanese Unexamined Patent Publication No. 2006-3589, which is designed to be used in the near-infrared region is known in the art; however, most of the surveillance camera lens systems are designed for variable-focal-length lens systems, have a large number of lens elements, and are not supplied in the market at a lower price.

In addition, Japanese Unexamined Patent Publication No. 2004-354829 discloses a single focal-length lens system which is designed to consider (the correcting of) chromatic aberration up to the near-infrared region; however, this lens system is constituted by a larger number of lens elements, i.e., seven lens elements, and is not supplied in the market at a lower price due to the use of cemented lens elements. Moreover, under a large temperature change, there would be a possibility that cemented lens elements are detached from each other.

In both of Japanese Unexamined Patent Publication Nos. H05-264895 and H10-39207, a four-lens-element arrangement is taught, and cemented lens element are not employed; however, the correcting of chromatic aberration cannot be made in the near-infrared region.

SUMMARY OF THE INVENTION

The present invention is to provide an inexpensive wide-angle lens system in which aberrations are adequately corrected from the visible light region to the near-infrared region, a four-lens-element arrangement is provided without including cemented lens elements, and an angle-of-view of more than 70° is attained.

According to a first aspect of the present invention, there is provided a wide-angle lens system including a first lens element constituted by a meniscus lens element having a negative refractive power and the convex surface facing toward the object (hereinafter, a negative first meniscus lens element), a second lens element having a positive refractive power (hereinafter, a positive second lens element), a biconvex third lens element having a positive refractive power (hereinafter, a positive third biconvex lens element), and a fourth lens element constituted by a meniscus lens element having a negative refractive power and the convex surface facing toward the image (hereinafter, a negative fourth meniscus lens element), in this order from the object.

The wide-angle lens system satisfies the following condition:

$$0.25 < \Delta H/(p3+p4) < 0.60 \tag{1}$$

wherein $\Delta H$ designates the distance between the second principal point of the positive third biconvex lens element and the first principal point of the negative fourth meniscus lens element, when the focal length of the entire wide-angle lens system is normalized to 1.0;

p3 designates the refractive power of the positive third biconvex lens element when the focal length of the entire wide-angle lens system is normalized to 1.0;

f3 designates the focal length of the positive third biconvex lens element when the focal length of the entire wide-angle lens system is normalized to 1.0, i.e., $p3=1/f3$;

p4 designates the refractive power of the negative fourth meniscus lens element when the focal length of the entire wide-angle lens system is normalized to 1.0; and f4 designates the focal length of the negative fourth meniscus lens element wherein the focal length of the entire wide-angle lens system is normalized to 1.0, i.e., $p4=1/f4$.

The wide-angle lens system preferably satisfies the following conditions:

$$1.00 < R7/R8 < 1.30 \tag{2}$$

$$-1.2 < (R7+R8)/2f < -0.8 \tag{3}$$

wherein

R7 designates the radius of curvature of the image-side surface of the positive third biconvex lens element;

R8 designates the radius of curvature of the object-side surface of the negative fourth meniscus lens element; and f designates the focal length of the entire wide-angle lens system.

The wide-angle lens system preferably satisfies the following conditions:

$$v4 < 23 \tag{4}$$

$$25 < (v3-v4) \tag{5}$$

wherein v3 designates the Abbe number of the positive third biconvex lens element; and v4 designates the Abbe number of the negative fourth meniscus lens element.

The wide-angle lens system preferably satisfies the following condition:

$$1.95 < (d2+d3+d4)/f < 3.00 \tag{6}$$

Wherein d2 designates the distance between the negative first meniscus lens element and the positive second lens element;

d3 designates the thickness of the positive second lens element;

d4 designates the distance between the image-side surface of the positive second lens element and a diaphragm; and f designates the focal length of the entire wide-angle lens system.

The wide-angle lens system preferably satisfies the following condition:

$$0.03 < A - B < 0.06 \qquad (7)$$

wherein $A = (nt3-1) \times (1-nt4)/(R7 \times R8/f^2)$;
$B = (nd3-1) \times (1-nd4)/(R7 \times R8/f^2)$;

nt3 designates the refractive index of the t-line of the positive third biconvex lens element;

nt4 designates the refractive index of the t-line of the negative fourth meniscus lens element;

nd3 designates the refractive index of the d-line of the positive third biconvex lens element;

nd4 designates the refractive index of the d-line of the negative fourth meniscus lens element;

R7 designates the radius of curvature of the image-side surface of the positive third biconvex lens element;

R8 designates the radius of curvature of the object-side surface of the negative fourth meniscus lens element; and f designates the focal length of the entire wide-angle lens system.

According to a second aspect of the present invention, there is provided a wide-angle lens system including a first lens element constituted by a meniscus lens element having a negative refractive power and the convex surface facing toward the object (hereinafter, a negative first meniscus lens element), a second lens element having a positive refractive power (hereinafter, a positive second lens element), a biconvex third lens element having a positive refractive power (hereinafter, a positive third biconvex lens element), and a fourth lens element constituted by a meniscus lens element having a negative refractive power and the convex surface facing toward the image (hereinafter, a negative fourth meniscus lens element), in this order from the object.

The wide-angle lens system satisfies the following condition:

$$0.032 < A - B < 0.06 \qquad (7')$$

wherein $A = (nt3-1) \times (1-nt4)/(R7 \times R8/f^2)$;
$B = (nd3-1) \times (1-nd4)/(R7 \times R8/f^2)$;

nt3 designates the refractive index of the t-line of the positive third biconvex lens element;

nt4 designates the refractive index of the t-line of the negative fourth meniscus lens element;

nd3 designates the refractive index of the d-line of the positive third biconvex lens element;

nd4 designates the refractive index of the d-line of the negative fourth meniscus lens element;

R7 designates the radius of curvature of the image-side surface of the positive third biconvex lens element;

R8 designates the radius of curvature of the object-side surface of the negative fourth meniscus lens element; and f designates the focal length of the entire wide-angle lens system.

The wide-angle lens system of the second aspect of the present invention preferably satisfies the following conditions:

$$1.00 < R7/R8 < 1.30 \qquad (2)$$

$$-1.2 < (R7+R8)/2f < -0.8 \qquad (3)$$

wherein

R7 designates the radius of curvature of the image-side surface of the positive third biconvex lens element;

R8 designates the radius of curvature of the object-side surface of the negative fourth meniscus lens element; and f designates the focal length of the entire wide-angle lens system.

The wide-angle lens system of the second aspect of the present invention preferably satisfies the following conditions:

$$v4 < 23 \qquad (4)$$

$$25 < (v3 - v4) \qquad (5)$$

wherein v3 designates the Abbe number of the positive third biconvex lens element; and v4 designates the Abbe number of the negative fourth meniscus lens element.

The wide-angle lens system of the second aspect of the present invention preferably satisfies the following condition:

$$1.95 < (d2+d3+d4)/f < 3.00 \qquad (6)$$

Wherein d2 designates the distance between the negative first meniscus lens element and the positive second lens element;

d3 designates the thickness of the positive second lens element;

d4 designates the distance between the image-side surface of the positive second lens element and a diaphragm; and f designates the focal length of the entire wide-angle lens system.

According to a third aspect of the present invention, there is provided a wide-angle lens system including a first lens element constituted by a meniscus lens element having a negative refractive power and the convex surface facing toward the object (hereinafter, a negative first meniscus lens element), a second lens element having a positive refractive power (hereinafter, a positive second lens element), a biconvex third lens element having a positive refractive power (hereinafter, a positive third biconvex lens element), and a fourth lens element constituted by a meniscus lens element having a negative refractive power and the convex surface facing toward the image (hereinafter, a negative fourth meniscus lens element), in this order from the object.

The wide-angle lens system satisfies the following conditions:

$$v4 < 23 \qquad (4)$$

$$25 < (v3 - v4) \qquad (5)$$

wherein v3 designates the Abbe number of the positive third biconvex lens element; and v4 designates the Abbe number of the negative fourth meniscus lens element.

The wide-angle lens system of the third aspect of the present invention preferably satisfies the following conditions:

$$1.00 < R7/R8 < 1.30 \qquad (2)$$

$$-1.2 < (R7+R8)/2f < -0.8 \qquad (3)$$

wherein

R7 designates the radius of curvature of the image-side surface of the positive third biconvex lens element;

R8 designates the radius of curvature of the object-side surface of the negative fourth meniscus lens element; and f designates the focal length of the entire wide-angle lens system.

The wide-angle lens system of the third aspect of the present invention preferably satisfies the following condition:

$$0.25 < \Delta H/(p3+p4) < 0.60 \quad (1)$$

wherein $\Delta H$ designates the distance between the second principal point of the positive third biconvex lens element and the first principal point of the negative fourth meniscus lens element, when the focal length of the entire wide-angle lens system is normalized to 1.0;

p3 designates the refractive power of the positive third biconvex lens element when the focal length of the entire wide-angle lens system is normalized to 1.0;

f3 designates the focal length of the positive third biconvex lens element when the focal length of the entire wide-angle lens system is normalized to 1.0, i.e., p3=1/f3;

p4 designates the refractive power of the negative fourth meniscus lens element when the focal length of the entire wide-angle lens system is normalized to 1.0; and f4 designates the focal length of the negative fourth meniscus lens element wherein the focal length of the entire wide-angle lens system is normalized to 1.0, i.e., p4=1/f4.

The wide-angle lens system of the third aspect of the present invention preferably satisfies the following condition:

$$1.95 < (d2+d3+d4)/f < 3.00 \quad (6)$$

Wherein d2 designates the distance between the negative first meniscus lens element and the positive second lens element;

d3 designates the thickness of the positive second lens element;

d4 designates the distance between the image-side surface of the positive second lens element and a diaphragm; and f designates the focal length of the entire wide-angle lens system.

The wide-angle lens system of the third aspect of the present invention preferably satisfies the following condition:

$$0.03 < A - B < 0.06 \quad (7)$$

wherein $A=(nt3-1)\times(1-nt4)/(R7 \times R8/f^2)$;
$B=(nd3-1)\times(1-nd4)/(R7 \times R8/f^2)$;

nt3 designates the refractive index of the t-line of the positive third biconvex lens element;

nt4 designates the refractive index of the t-line of the negative fourth meniscus lens element;

nd3 designates the refractive index of the d-line of the positive third biconvex lens element;

nd4 designates the refractive index of the d-line of the negative fourth meniscus lens element;

R7 designates the radius of curvature of the image-side surface of the positive third biconvex lens element;

R8 designates the radius of curvature of the object-side surface of the negative fourth meniscus lens element; and f designates the focal length of the entire wide-angle lens system.

The present disclosure relates to subject matter contained in Japanese Patent Application No. 2006-299867 (filed on Nov. 6, 2006) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

The wide-angle lens system according to the present invention, as shown in FIGS. 1, 3, 5, 7, 9, 11 and 13, includes a first lens element 11 constituted by a meniscus lens element having a negative refractive power and the convex surface facing toward the object (hereinafter, a negative first meniscus lens element 11), a second lens element 12 having a positive refractive power (hereinafter, a positive second lens element 12), a diaphragm S, a biconvex third lens element 13 having a positive refractive power (hereinafter, a positive third biconvex lens element 13), a fourth lens element 14 constituted by a meniscus lens element having a negative refractive power and the convex surface facing toward the image (hereinafter, a negative fourth meniscus lens element 14), and a cover glass 15 provided in front of an imaging device, in this order from the object.

In each embodiment, the diaphragm S is provided between the positive second lens element 12 and the positive third biconvex lens element 13.

Each of the negative first meniscus lens element 11 through the negative fourth meniscus lens element 14 is a single lens element formed from optical glass. Any one of these lens elements is not constituted by cemented lens elements, nor is made of plastic.

The radius of curvature of the image-side surface of the positive third biconvex lens element 13 is smaller than that of the object-side surface of the negative fourth meniscus lens element 14. The positive third biconvex lens element 13 and the negative fourth meniscus lens element 14 are arranged to mutually come into contact with each other at a peripheral portion which is slightly outside the effective diameter.

In a lens system of a four-lens-element arrangement, the correcting of chromatic aberration, and that of other aberrations as well, have to be carried out by the four lens elements, i.e., fewer number of lens elements. Therefore suitable selection of optical glass, and appropriate distribution of refractive power over the entire lens system are required.

Moreover, the lens system is used in an environment where a temperature change is very large, so that it is not preferable to employ resin lens element and cemented lens elements. It is preferable that the lens elements be formed from optical glass only.

On the other hand, an aspherical lens element formed by glass molding using optical glass could be employed; however, such an aspherical lens element is expensive, and undesirably increases manufacturing costs.

In the wide-angle lens system of the present invention constituted by the four lens elements, i.e., the negative first meniscus lens element 11, the positive second lens element 12, the positive third biconvex lens element 13 and the negative fourth meniscus lens element 14, in this order from the object, the features of the present invention particularly resides in the positive third biconvex lens element 13 and the negative fourth meniscus lens element 14.

Conditions (1) through (5) and (7) are to be satisfied by the positive third biconvex lens element 13 and the negative fourth meniscus lens element 14.

Condition (1) is for correcting coma and astigmatic difference in a well balanced manner on the condition that a glass material which is suitable for correcting chromatic aberration from the visible light region to the near-infrared region is selected.

If $\Delta H/(p3+p4)$ exceeds the upper limit of condition (1), astigmatic difference undesirably becomes larger.

If $\Delta H/(p3+p4)$ exceeds the lower limit of condition (1), the correcting of coma becomes difficult.

Condition (2) specifies the radius of curvature of the image-side surface of the positive third biconvex lens element 13 and that of the object-side surface of the negative fourth meniscus lens element 14. By satisfying condition (2), the radius of curvature of the image-side surface of the positive third biconvex lens element 13 and that of the object-side surface of the negative fourth meniscus lens element 14 can be made smaller, and these lens elements 13 and 14 can be arranged to mutually come into contact with each other at a peripheral portion which is slightly outside the effective diameter. In other words, by satisfying condition (2), surface-contact between the positive third biconvex lens element 13 and the negative fourth meniscus lens element 14 becomes possible, and the correcting of various aberrations can be made suitably.

In an environment where a temperature change is very large, it is preferable that these lens elements 13 and 14 be arranged to surface-contact so that the change in the distance therebetween can be made minimum.

If R7/R8 exceeds the lower limit of condition (2), the surface-contact between the positive third biconvex lens element 13 and the negative fourth meniscus lens element 14 becomes impossible.

If R7/R8 exceeds the upper limit of condition (2), aberrations occurred in the image-side surface of the positive third biconvex lens element 13 and aberrations occurred in the object-side surface of the negative fourth meniscus lens element 14 cannot undesirably be cancelled out to each other.

Condition (3) specifies the radius of curvature of the image-side surface of the positive third biconvex lens element 13 and that of the object-side surface of the negative fourth meniscus lens element 14 from a different aspect. By satisfying condition (3), it is possible to correct coma and lateral chromatic aberration in a well balanced manner.

If (R7+R8)/2f exceeds the upper limit of condition (3), the correcting of coma undesirably becomes difficult.

If (R7+R8)/2f exceeds the lower limit of condition (3), the correcting of lateral chromatic aberration becomes difficult.

Conditions (4) and (5) specifies the Abbe number (a glass material) of the positive third biconvex lens element 13 and the negative fourth meniscus lens element 14. By satisfying conditions (4) and (5), chromatic aberration can be adequately corrected from the visible light region to the rear-infrared light region.

If a glass material having an Abbe number which does not satisfy conditions (4) and (5) is used, it becomes difficult to adequately correct chromatic aberration, and the usable wave-length range is decreased.

A sensor camera to which the wide-angle lens system of the present invention is applied is a digital camera utilizing an imaging device. Accordingly, in order to secure telecentricity on the image side to some extent, and to prevent excessive distortion, it is preferable to satisfy condition (6).

If (d2+d3+d4)/f exceeds the upper limit of condition (6), it is advantageous to correct distortion; however, it becomes difficult to secure telecentricity.

If (d2+d3+d4)/f exceeds the lower limit of condition (6), it is advantageous to secure telecentricity; however, it becomes difficult to adequately reduce distortion. Moreover, it becomes difficult to secure an edge thickness of the positive third biconvex lens element 13.

Condition (7) is for adequately correcting chromatic aberration from the visible light region through to the near-infrared region.

If A-B exceeds either the upper or lower limits of condition (7), it becomes difficult to adequately correct chromatic aberration from the visible light range to the near-infrared range, and the usable wave-length range is decreased.

Furthermore, if condition (7') is satisfied, chromatic aberration from the visible light region through to the near-infrared region can be more effectively corrected.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number.

Embodiment 1

Figure 1:
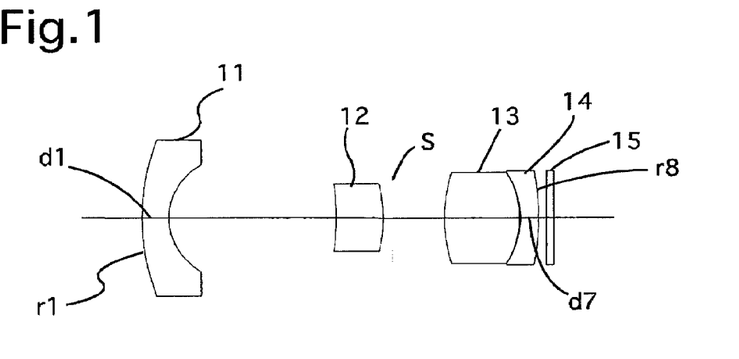
FIG. 1 is a lens arrangement of the wide-angle zoom lens system according to a first embodiment of the present invention.
Figures 2A, 2B:
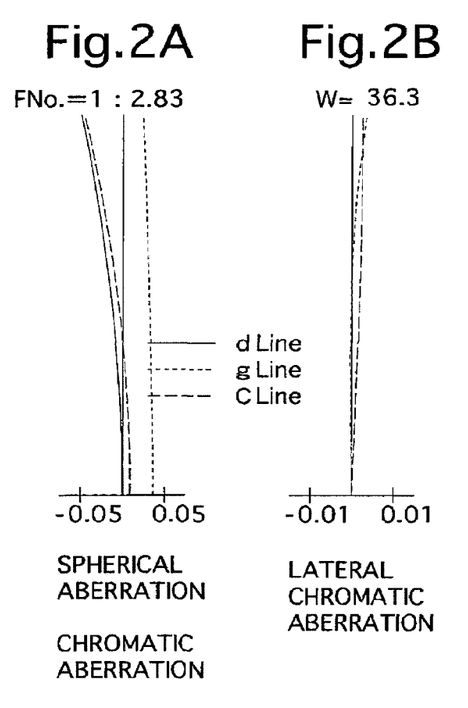
FIGS. 2A, 2B, 2C and 2D show aberrations occurred in the lens arrangement shown in FIG. 1.
Figure 2C:
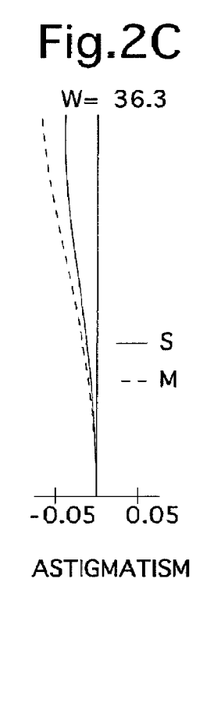
Figure 2D:
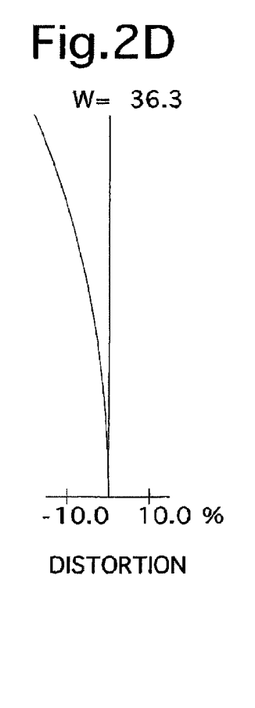

FIG. 1 is the lens arrangement of the wide-angle zoom lens system according to the first embodiment of the present invention. FIGS. 2A through 2D show aberrations occurred in the lens arrangement shown in FIG. 1. Table 1 shows the numerical data of the first embodiment.

The wide-angle lens system includes the negative first meniscus lens element 11 having the convex surface facing toward the object, the positive second lens element 12 having the convex surface facing toward the image, the diaphragm S, the positive third biconvex lens element 13, the negative fourth meniscus lens element 14 having the convex surface facing toward the image, and the cover glass 15 (thickness=0.4, $N_d$=1.51633, $\nu$=64.1; the same for all embodiments) provided in front of an imaging device, in this order from the object.

The numerical data in the Tables does not include that of the cover glass 15 (i.e., the value of fB does not include the cover glass 15; the same for all embodiments).

The diaphragm S is provided 5.00 behind the second lens element 12 (surface No. 4).

TABLE 1

FNO = 1:2.83
f = 4.57
W = 36.3
fB = 7.64

| Surf. No. | r | d | $N_d$ | $N_t$ | $\nu$ |
|---|---|---|---|---|---|
| 1 | 14.174 | 1.50 | 1.58913 | 1.57814 | 61.2 |
| 2 | 3.894 | 9.40 | | | |
| 3 | −16.900 | 2.60 | 1.79952 | 1.77941 | 42.2 |
| 4 | −8.757 | 3.41 | | | |
| 5 | 9.800 | 4.24 | 1.77250 | 1.75541 | 49.6 |
| 6 | −5.507 | 0.06 | | | |
| 7 | −5.310 | 1.00 | 1.92286 | 1.87807 | 18.9 |
| 8 | −16.541 | — | | | |

Embodiment 2

Figure 3:
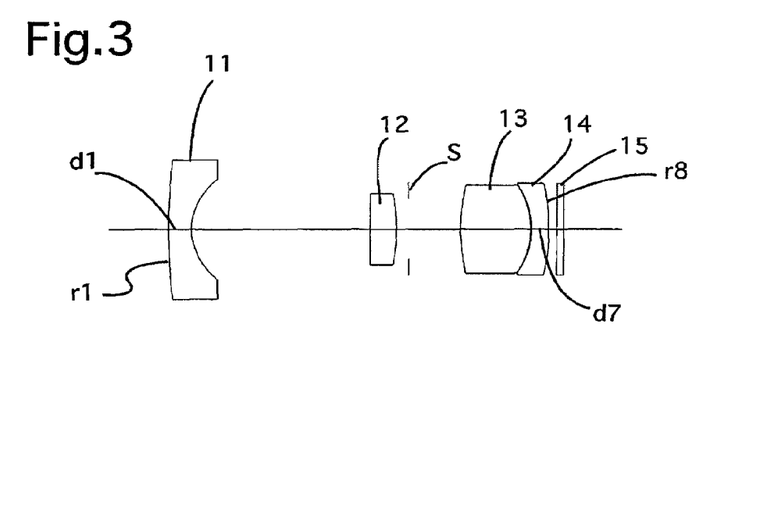
FIG. 3 is a lens arrangement of the wide-angle zoom lens system according to a second embodiment of the present invention.
Figures 4A, 4B:
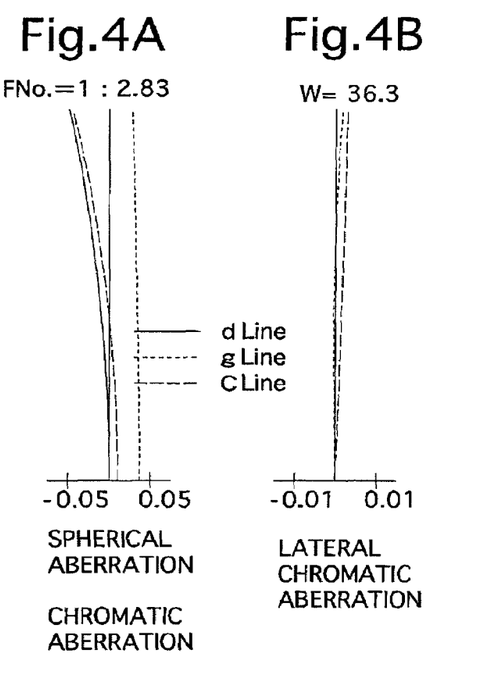
FIGS. 4A, 4B, 4C and 4D show aberrations occurred in the lens arrangement shown in FIG. 3.
Figure 4C:
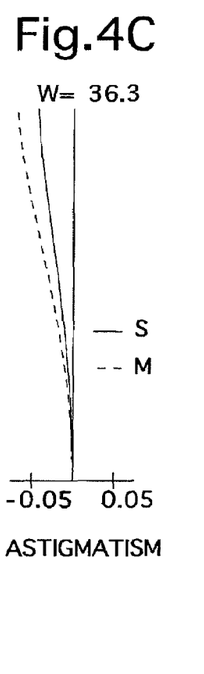
Figure 4D:
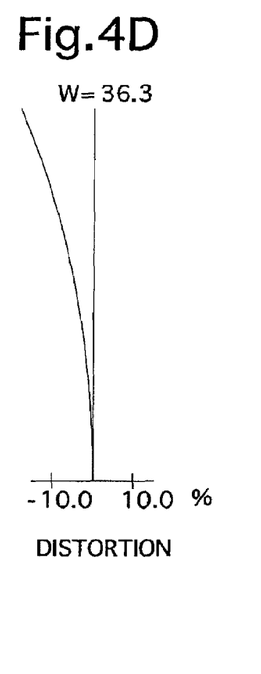

FIG. 3 is the lens arrangement of the wide-angle zoom lens system according to the second embodiment of the present invention. FIGS. 4A through 4D show aberrations occurred in the lens arrangement shown in FIG. 3. Table 2 shows the numerical data of the second embodiment.

The basic lens arrangement of the second embodiment is the same as that of the first embodiment except that the positive second lens element 12 is constituted by a planoconvex lens element having the object-side flat surface.

The diaphragm S is provided 0.670 behind the second lens element 12 (surface No. 4).

TABLE 2

FNO = 1:2.83
f = 4.57
W = 36.3
fB = 8.27

| Surf. No. | r | d | $N_d$ | $N_t$ | $\nu$ |
|---|---|---|---|---|---|
| 1 | 39.828 | 1.30 | 1.58913 | 1.57814 | 61.2 |
| 2 | 4.111 | 10.17 | | | |
| 3 | ∞ | 1.51 | 1.78590 | 1.76702 | 44.2 |
| 4 | −11.634 | 3.62 | | | |
| 5 | 12.748 | 3.93 | 1.74100 | 1.72524 | 52.7 |
| 6 | −5.452 | 0.06 | | | |
| 7 | −5.300 | 1.00 | 1.92286 | 1.87807 | 18.9 |
| 8 | −13.823 | — | | | |

Embodiment 3

Figure 5:
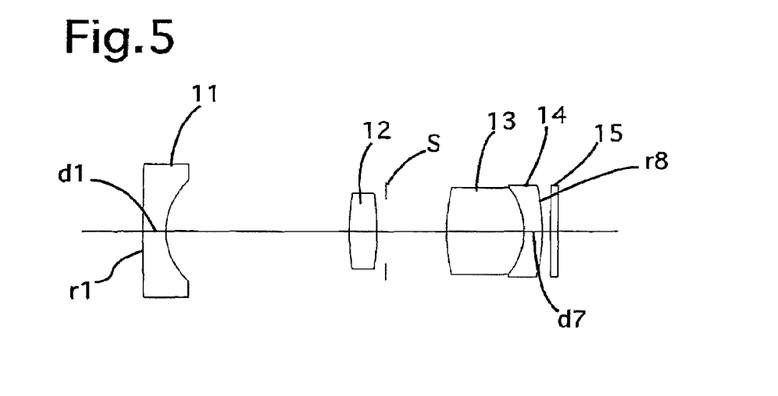
FIG. 5 is a lens arrangement of the wide-angle zoom lens system according to a third embodiment of the present invention.
Figures 6A, 6B:
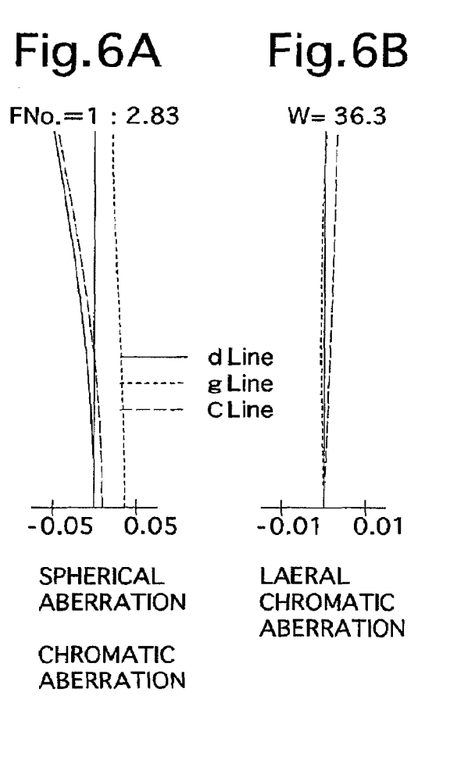
FIGS. 6A, 6B, 6C and 6D show aberrations occurred in the lens arrangement shown in FIG. 5.
Figure 6C:
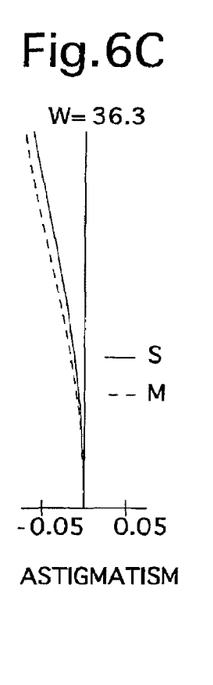
Figure 6D:
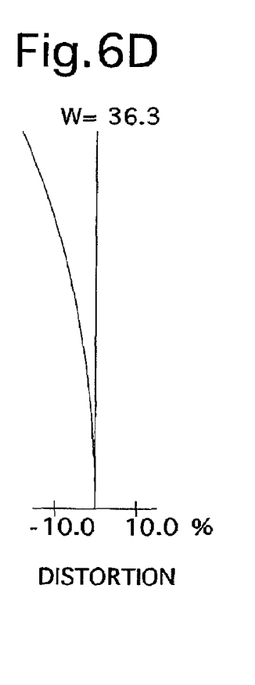

FIG. 5 is the lens arrangement of the wide-angle zoom lens system according to the third embodiment of the present invention. FIGS. 6A through 6D show aberrations occurred in the lens arrangement shown in FIG. 5. Table 3 shows the numerical data of the third embodiment.

The basic lens arrangement of the third embodiment is the same as that of the first embodiment except that the positive second lens element 12 is constituted by a biconvex positive lens element.

The diaphragm S is provided 0.500 behind the second lens element 12 (surface No. 4).

TABLE 3

FNO = 1:2.83
f = 4.57
W = 36.3
fB = 7.48

| Surf. No. | r | d | $N_d$ | $N_t$ | $\nu$ |
|---|---|---|---|---|---|
| 1 | 154.199 | 1.30 | 1.65844 | 1.64446 | 50.9 |
| 2 | 4.499 | 10.28 | | | |
| 3 | 17.325 | 1.55 | 1.75500 | 1.73893 | 52.3 |
| 4 | −17.325 | 3.91 | | | |
| 5 | 12.188 | 4.32 | 1.65844 | 1.64446 | 50.9 |
| 6 | −4.668 | 0.02 | | | |
| 7 | −4.624 | 1.00 | 1.92286 | 1.87807 | 18.9 |
| 8 | −12.161 | — | | | |

Embodiment 4

Figure 7:
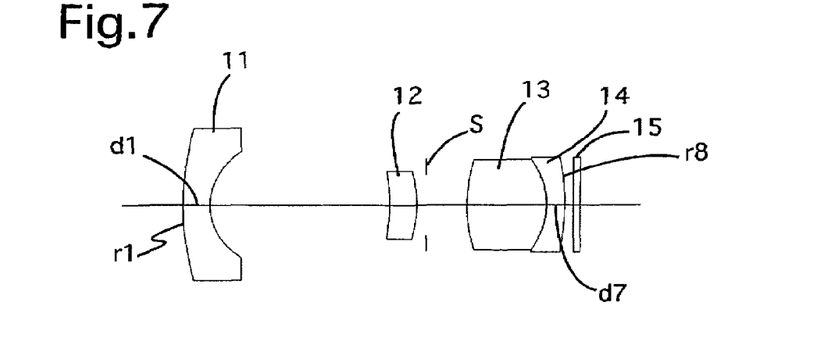
FIG. 7 is a lens arrangement of the wide-angle zoom lens system according to a fourth embodiment of the present invention.
Figures 8A, 8B, 8C:
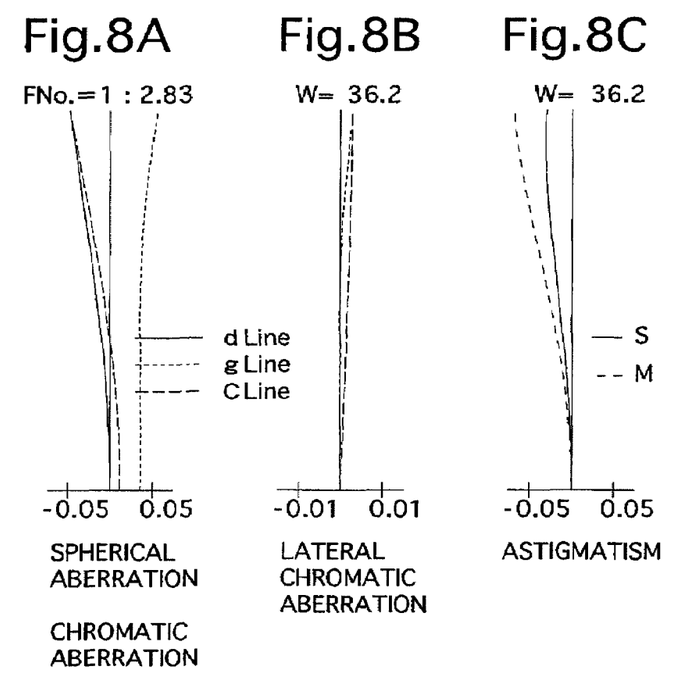
FIGS. 8A, 8B, 8C and 8D show aberrations occurred in the lens arrangement shown in FIG. 7.
Figure 8D:
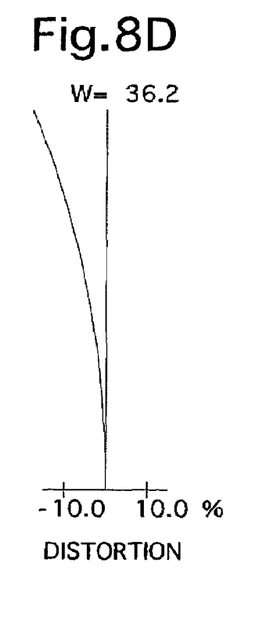

FIG. 7 is the lens arrangement of the wide-angle zoom lens system according to the fourth embodiment of the present invention. FIGS. 8A through 8D show aberrations occurred in the lens arrangement shown in FIG. 7. Table 4 shows the numerical data of the fourth embodiment.

The basic lens arrangement of the fourth embodiment is the same as that of the first embodiment; however, the combined focal length of the negative first meniscus lens element 11 and the positive second lens element 12 is negative.

The diaphragm S is provided 0.500 behind the second lens element 12 (surface No. 4).

TABLE 4

FNO = 1:2.83
f = 4.57
W = 36.2
fB = 8.68

| Surf. No. | r | d | $N_d$ | $N_t$ | $\nu$ |
|---|---|---|---|---|---|
| 1 | 17.576 | 1.50 | 1.58913 | 1.57814 | 61.2 |
| 2 | 3.905 | 9.98 | | | |
| 3 | −13.241 | 1.51 | 1.74000 | 1.71480 | 28.3 |
| 4 | −7.997 | 2.81 | | | |
| 5 | 10.697 | 4.36 | 1.78800 | 1.76995 | 47.4 |
| 6 | −4.851 | 0.03 | | | |
| 7 | −4.752 | 1.00 | 1.92286 | 1.87807 | 18.9 |
| 8 | −14.193 | — | | | |

Embodiment 5

Figure 9:
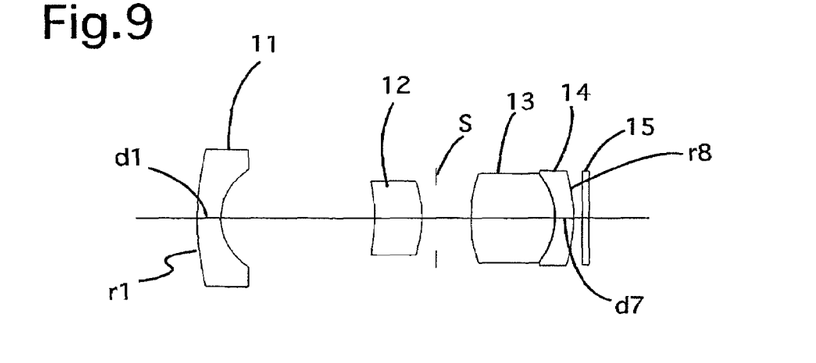
FIG. 9 is a lens arrangement of the wide-angle zoom lens system according to a fifth embodiment of the present invention.
Figures 10A, 10B:
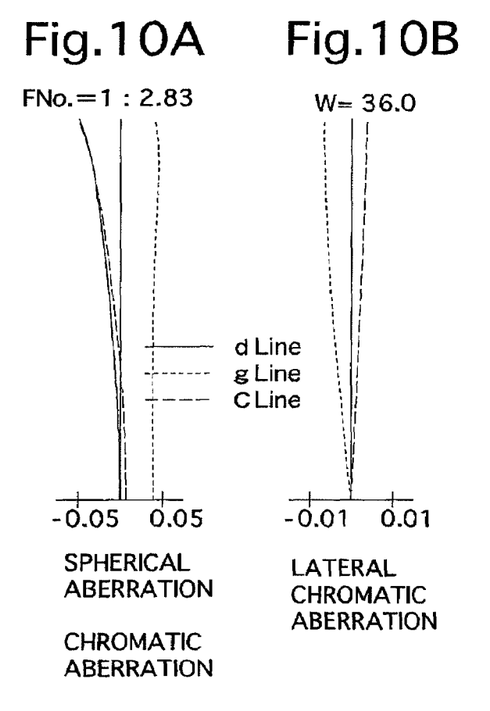
FIGS. 10A, 10B, 10C and 10D show aberrations occurred in the lens arrangement shown in FIG. 9.
Figure 10C:
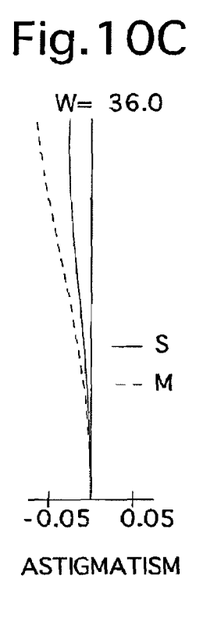
Figure 10D:
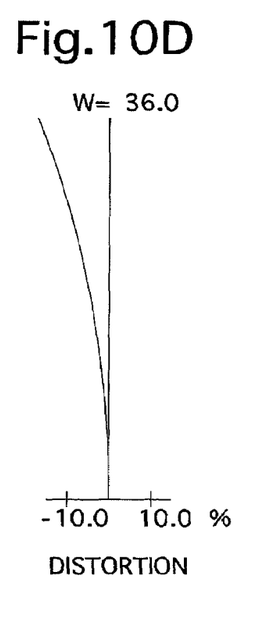

FIG. 9 is the lens arrangement of the wide-angle zoom lens system according to the fifth embodiment of the present invention. FIGS. 10A through 10D show aberrations occurred in the lens arrangement shown in FIG. 9. Table 5 shows the numerical data of the fifth embodiment.

The basic lens arrangement of the fifth embodiment is the same as that of the first embodiment.

The diaphragm S is provided 0.780 behind the second lens element 12 (surface No. 4).

TABLE 5

FNO = 1:2.83
f = 4.57
W = 36.0
fB = 8.89

| Surf. No. | r | d | $N_d$ | $N_t$ | ν |
|---|---|---|---|---|---|
| 1 | 17.758 | 1.30 | 1.62041 | 1.60876 | 60.3 |
| 2 | 3.662 | 8.62 | | | |
| 3 | −13.463 | 2.60 | 1.78800 | 1.76995 | 47.4 |
| 4 | −7.696 | 2.74 | | | |
| 5 | 9.275 | 4.64 | 1.62041 | 1.60876 | 60.3 |
| 6 | −4.607 | 0.06 | | | |
| 7 | −4.534 | 1.00 | 1.92286 | 1.88302 | 21.3 |
| 8 | −9.622 | — | | | |

Embodiment 6

Figure 11:
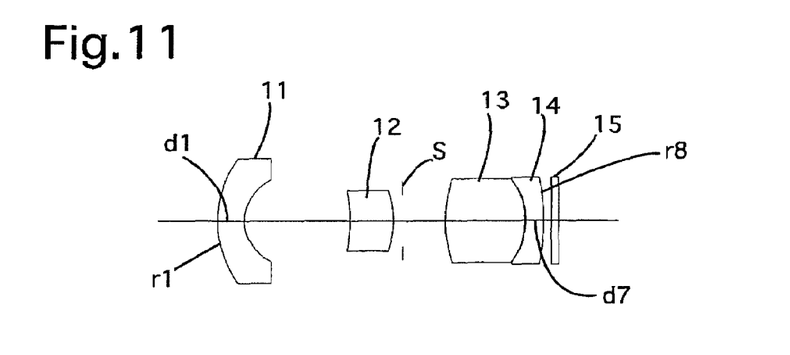
FIG. 11 is a lens arrangement of the wide-angle zoom lens system according to a sixth embodiment of the present invention.
Figure 12A:
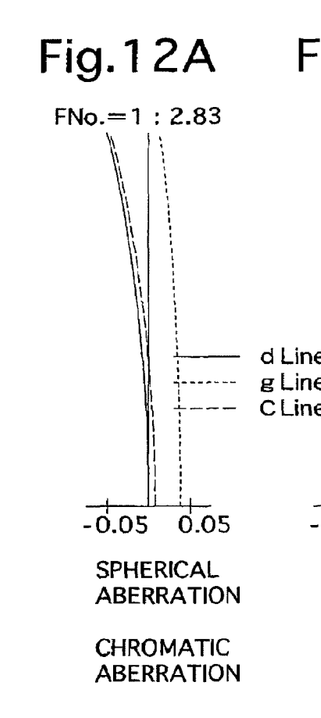
FIGS. 12A, 12B, 12C and 12D show aberrations occurred in the lens arrangement shown in FIG. 11.
Figure 12B:
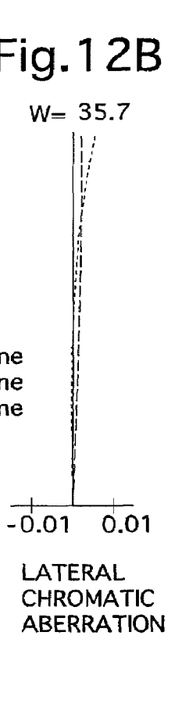
Figure 12C:
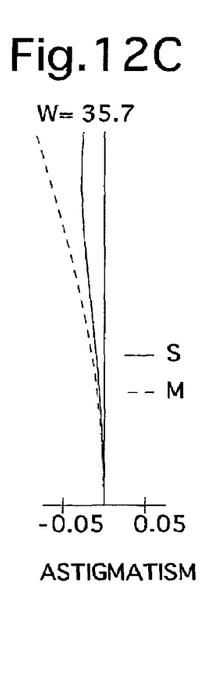
Figure 12D:
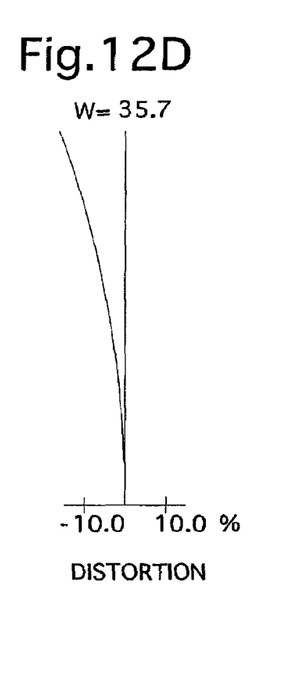

FIG. 11 is the lens arrangement of the wide-angle zoom lens system according to the sixth embodiment of the present invention. FIGS. 12A through 12D show aberrations occurred in the lens arrangement shown in FIG. 11. Table 6 shows the numerical data of the sixth embodiment.

The fundamental arrangement of the sixth embodiment is the same as that of the first embodiment; however, the distance from the apex of the object-side surface of the negative first meniscus lens element 11 to an image position is shorter than that of the first through fifth embodiments.

The diaphragm S is provided 0.500 behind the second lens element 12 (surface No. 4).

TABLE 6

FNO = 1:2.83
f = 4.57
W = 35.7
fB = 6.57

| Surf. No. | r | d | $N_d$ | $N_t$ | ν |
|---|---|---|---|---|---|
| 1 | 7.174 | 1.50 | 1.75700 | 1.73974 | 47.8 |
| 2 | 2.959 | 6.00 | | | |
| 3 | −10.544 | 2.50 | 1.80400 | 1.78537 | 46.6 |
| 4 | −6.020 | 2.94 | | | |
| 5 | 9.449 | 4.52 | 1.77250 | 1.75541 | 49.6 |
| 6 | −4.616 | 0.06 | | | |
| 7 | −4.460 | 1.00 | 1.92286 | 1.87807 | 18.9 |
| 8 | −13.790 | — | | | |

Embodiment 7

Figure 13:
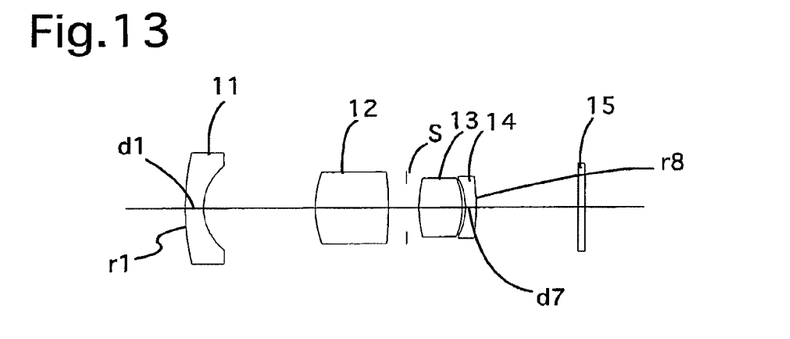
FIG. 13 is a lens arrangement of the wide-angle zoom lens system according to a seventh embodiment of the present invention.
Figures 14A, 14B:
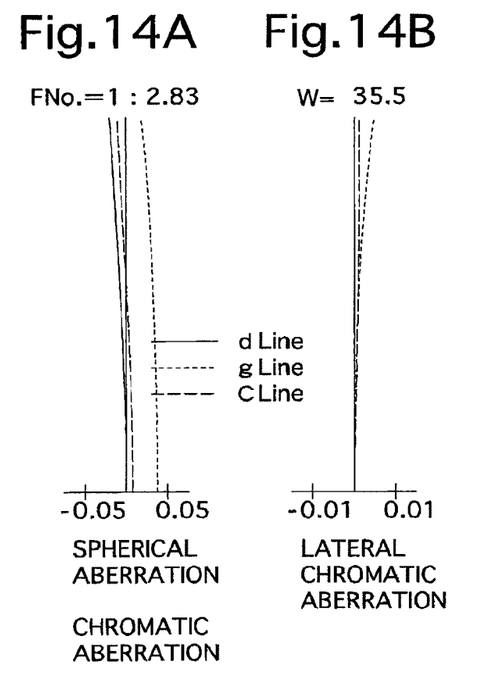
FIGS. 14A, 14B, 14C and 14D show aberrations occurred in the lens arrangement shown in FIG. 13.
Figure 14C:
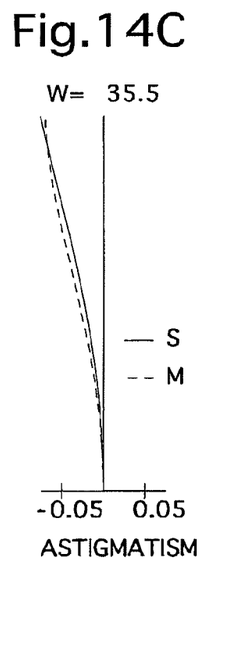
Figure 14D:
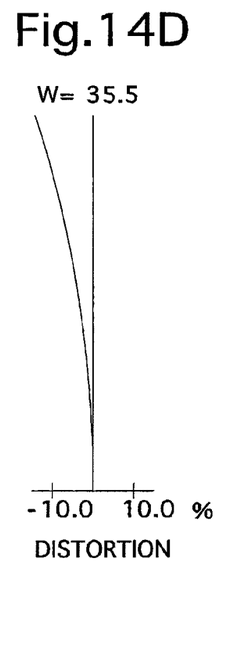

FIG. 13 is the lens arrangement of the wide-angle zoom lens system according to the seventh embodiment of the present invention. FIGS. 14A through 14D show aberrations occurred in the lens arrangement shown in FIG. 13. Table 7 shows the numerical data of the seventh embodiment.

The basic lens arrangement of the seventh embodiment is the same as that of the first embodiment; however, the distance from the apex of the object-side surface of the negative first meniscus lens element 11 to an image position is further shorter than that of the sixth embodiments.

The diaphragm S is provided 1.050 behind the second lens element 12 (surface No. 4).

TABLE 7

FNO = 1:2.83
f = 4.50
W = 35.5
fB = 6.08

| Surf. No. | r | d | $N_d$ | $N_t$ | ν |
|---|---|---|---|---|---|
| 1 | 17.750 | 1.00 | 1.77250 | 1.75541 | 49.6 |
| 2 | 3.600 | 6.27 | | | |
| 3 | 7.241 | 4.10 | 1.69350 | 1.67894 | 53.2 |
| 4 | −26.650 | 1.75 | | | |
| 5 | 8.800 | 2.45 | 1.77250 | 1.75541 | 49.6 |
| 6 | −5.310 | 0.20 | | | |
| 7 | −4.161 | 0.60 | 1.92286 | 1.87807 | 18.9 |
| 8 | −15.904 | — | | | |

The numerical values of each condition for each embodiment are shown in Table 8.

TABLE 8

| | Cond. (1) | Cond. (2) | Cond. (3) | Cond. (4) |
|---|---|---|---|---|
| Embod. 1 | 0.470 | 1.037 | −1.183 | 18.9 |
| Embod. 2 | 0.295 | 1.029 | −1.176 | 18.9 |
| Embod. 3 | 0.389 | 1.010 | −1.017 | 18.9 |
| Embod. 4 | 0.353 | 1.020 | −1.051 | 18.9 |
| Embod. 5 | 0.390 | 1.016 | −1.000 | 21.3 |
| Embod. 6 | 0.453 | 1.035 | −0.993 | 18.9 |
| Embod. 7 | 0.574 | 1.276 | −1.052 | 18.9 |

| | Cond. (5) | Cond. (6) | Cond. (7) |
|---|---|---|---|
| Embod. 1 | 30.7 | 2.735 | 0.035 |
| Embod. 2 | 33.8 | 2.687 | 0.034 |
| Embod. 3 | 32.0 | 2.698 | 0.040 |
| Embod. 4 | 28.5 | 2.624 | 0.046 |
| Embod. 5 | 39.0 | 2.626 | 0.035 |
| Embod. 6 | 30.7 | 2.865 | 0.050 |
| Embod. 7 | 30.7 | 1.969 | 0.046 |

As can be understood from Table 8, the first through seventh embodiments satisfy conditions (1) through (7). Furthermore, as can be understood from the aberration diagrams, the various aberrations are adequately corrected.

According to the present invention, a wide-angle lens system with the following features can be attained:

(i) aberrations are adequately corrected from the visible light region to the near-infrared region;

(ii) a four-lens-element arrangement is provided without including cemented lens elements;

(iii) an angle-of-view exceeding 70° is attained; and (iv) production costs are lower.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A wide-angle lens system comprises a negative first meniscus lens element having the convex surface facing toward an object, a positive second lens element, a positive third biconvex lens element, and a negative fourth meniscus lens element having the convex surface facing toward an image, in this order from the object;

wherein said wide-angle lens system satisfies the following condition:

$$0.25 < \Delta H/(p3+p4) < 0.60$$

wherein

ΔH designates the distance between the second principal point of said positive third biconvex lens element and the first principal point of said negative fourth meniscus lens element, when the focal length of the entire wide-angle lens system is normalized to 1.0;

p3 designates the refractive power of said positive third biconvex lens element when the focal length of the entire wide-angle lens system is normalized to 1.0;

f3 designates the focal length of said positive third biconvex lens element when the focal length of the entire wide-angle lens system is normalized to 1.0, i.e., p3=1/f3;

p4 designates the refractive power of said negative fourth meniscus lens element when the focal length of the entire wide-angle lens system is normalized to 1.0; and f4 designates the focal length of said negative fourth meniscus lens element wherein the focal length of the entire wide-angle lens system is normalized to 1.0, i.e., p4=1/f4.

2. The wide-angle lens system according to claim 1, further satisfying the following conditions:

$$1.00 < R7/R8 < 1.30$$

$$-1.2 < (R7+R8)/2f < -0.8$$

wherein

R7 designates the radius of curvature of the image-side surface of said positive third biconvex lens element;

R8 designates the radius of curvature of the object-side surface of said negative fourth meniscus lens element; and f designates the focal length of the entire wide-angle lens system.

3. The wide-angle lens system according to claim 1, further satisfying the following conditions:

$$v4 < 23$$

$$25 < (v3-v4)$$

wherein v3 designates the Abbe number of said positive third biconvex lens element; and v4 designates the Abbe number of said negative fourth meniscus lens element.

4. The wide-angle lens system according to claim 1, further satisfying the following condition:

$$1.95 < (d2+d3+d4)/f < 3.00$$

Wherein d2 designates the distance between said negative first meniscus lens element and said positive second lens element;

d3 designates the thickness of said positive second lens element;

d4 designates the distance between the image-side surface of said positive second lens element and a diaphragm; and f designates the focal length of the entire wide-angle lens system.

5. The wide-angle lens system according to claim 1, further satisfying the following condition:

$$0.03 < A - B < 0.06$$

wherein $$A = (nt3-1) \times (1-nt4)/(R7 \times R8/f^2);$$

$$B = (nd3-1) \times (1-nd4)/(R733\, R8/f^2);$$

nt3 designates the refractive index of the t-line of said positive third biconvex lens element;

nt4 designates the refractive index of the t-line of said negative fourth meniscus lens element;

nd3 designates the refractive index of the d-line of said positive third biconvex lens element;

nd4 designates the refractive index of the d-line of said negative fourth meniscus lens element;

R7 designates the radius of curvature of the image-side surface of said positive third biconvex lens element;

R8 designates the radius of curvature of the object-side surface of said negative fourth meniscus lens element; and f designates the focal length of the entire wide-angle lens system.

6. A wide-angle lens system comprises a negative first meniscus lens element having the convex surface facing toward an object, a positive second lens element, a positive third biconvex lens element, and a negative fourth meniscus lens element having the convex surface facing toward an image, in this order from the object;

wherein said wide-angle lens system satisfies the following condition:

$$0.032 < A - B < 0.06$$

wherein $$A = (nt3-1) \times (1-nt4)/(R7 \times R8/f^2);$$

$$B = (nd3-1) \times (1-nd4)/(R7 \times R8/f^2);$$

nt3 designates the refractive index of the t-line of said positive third biconvex lens element;

nt4 designates the refractive index of the t-line of said negative fourth meniscus lens element;

nd3 designates the refractive index of the d-line of said positive third biconvex lens element;

nd4 designates the refractive index of the d-line of said negative fourth meniscus lens element;

R7 designates the radius of curvature of the image-side surface of said positive third biconvex lens element;

R8 designates the radius of curvature of the object-side surface of said negative fourth meniscus lens element; and f designates the focal length of the entire wide-angle lens system.

7. The wide-angle lens system according to claim 6, further satisfying the following conditions:

$$1.00 < R7/R8 < 1.30$$

$$-1.2 < (R7+R8)/2f < -0.8$$

wherein

R7 designates the radius of curvature of the image-side surface of said positive third biconvex lens element;

R8 designates the radius of curvature of the object-side surface of said negative fourth meniscus lens element; and f designates the focal length of the entire wide-angle lens system.

8. The wide-angle lens system according to claim 6, further satisfying the following conditions:

$$v4 < 23$$

$$25 < (v3-v4)$$

wherein v3 designates the Abbe number of said positive third biconvex lens element; and v4 designates the Abbe number of said negative fourth meniscus lens element.

9. The wide-angle lens system according to claim 6, further satisfying the following condition:

$$1.95<(d2+d3+d4)/f<3.00$$

Wherein d2 designates the distance between said negative first meniscus lens element and said positive second lens element;

d3 designates the thickness of said positive second lens element;

d4 designates the distance between the image-side surface of said positive second lens element and a diaphragm; and f designates the focal length of the entire wide-angle lens system.

10. A wide-angle lens system comprises a negative first meniscus lens element having the convex surface facing toward an object, a positive second lens element, a positive third biconvex lens element, and a negative fourth meniscus lens element having the convex surface facing toward an image, in this order from the object;

wherein said wide-angle lens system satisfies the following condition:

$$v4<23$$

$$25<(v3-v4)$$

wherein v3 designates the Abbe number of said positive third biconvex lens element; and v4 designates the Abbe number of said negative fourth meniscus lens element.

11. The wide-angle lens system according to claim 10, further satisfying the following conditions:

$$1.00<R7/R8<1.30$$

$$-1.2<(R7+R8)/2f<-0.8$$

wherein

R7 designates the radius of curvature of the image-side surface of said positive third biconvex lens element;

R8 designates the radius of curvature of the object-side surface of said negative fourth meniscus lens element; and f designates the focal length of the entire wide-angle lens system.

12. The wide-angle lens system according to claim 10, further satisfying the following conditions:

$$0.25<\Delta H/(p3+p4)<0.60$$

wherein $\Delta$H designates the distance between the second principal point of said positive third biconvex lens element and the first principal point of said negative fourth meniscus lens element, when the focal length of the entire wide-angle lens system is normalized to 1.0;

p3 designates the refractive power of said positive third biconvex lens element when the focal length of the entire wide-angle lens system is normalized to 1.0;

f3 designates the focal length of said positive third biconvex lens element when the focal length of the entire wide-angle lens system is normalized to 1.0, i.e., p3=1/f3;

p4 designates the refractive power of said negative fourth meniscus lens element when the focal length of the entire wide-angle lens system is normalized to 1.0; and f4 designates the focal length of said negative fourth meniscus lens element wherein the focal length of the entire wide-angle lens system is normalized to 1.0, i.e., p4=1/f4.

13. The wide-angle lens system according to claim 10, further satisfying the following condition;

$$1.95<(d2+d3+d4)/f<3.00$$

Wherein d2 designates the distance between said negative first meniscus lens element and said positive second lens element;

d3 designates the thickness of said positive second lens element;

d4 designates the distance between the image-side surface of said positive second lens element and a diaphragm; and f designates the focal length of the entire wide-angle lens system.

14. The wide-angle lens system according to claim 10, further satisfying the following condition:

$$0.03<A-B<0.06$$

wherein $$A=(nt3-1)\times(1-nt4)/(R7\times R8/f^2);$$

$$B=(nd3-1)\times(1-nd4)/(R7\times R8/f^2);$$

nt3 designates the refractive index of the t-line of said positive third biconvex lens element;

nt4 designates the refractive index of the t-line of said negative fourth meniscus lens element;

nd3 designates the refractive index of the d-line of said positive third biconvex lens element;

nd4 designates the refractive index of the d-line of said negative fourth meniscus lens element;

R7 designates the radius of curvature of the image-side surface of said positive third biconvex lens element;

R8 designates the radius of curvature of the object-side surface of said negative fourth meniscus lens element; and f designates the focal length of the entire wide-angle lens system.

* * * * *